United States Patent
Roberts et al.

(10) Patent No.: US 11,136,436 B2
(45) Date of Patent: Oct. 5, 2021

(54) METHOD FOR CONDENSATION POLYMERIZATION OF HYDROXYL-TERMINATED POLYDIORGANOSILOXANES

(71) Applicants: Dow Silicones Corporation, Midland, MI (US); Dow Global Technologies LLC, Midland, MI (US)

(72) Inventors: John Roberts, Midland, MI (US); Matthew Belowich, Midland, MI (US); Thomas Peterson, Midland, MI (US); Vladimir Pushkarev, Mount Pleasant, MI (US); Evelyn Auyeung, Houston, TX (US); Mark Rickard, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/734,086

(22) PCT Filed: Jul. 3, 2019

(86) PCT No.: PCT/US2019/040442
§ 371 (c)(1),
(2) Date: Dec. 1, 2020

(87) PCT Pub. No.: WO2020/040886
PCT Pub. Date: Feb. 27, 2020

(65) Prior Publication Data
US 2021/0221956 A1    Jul. 22, 2021

Related U.S. Application Data

(60) Provisional application No. 62/722,349, filed on Aug. 24, 2018, provisional application No. 62/760,080, filed on Nov. 13, 2018.

(51) Int. Cl.
*C08G 77/08* (2006.01)
*C08G 77/10* (2006.01)
*C08G 77/16* (2006.01)

(52) U.S. Cl.
CPC ............. *C08G 77/08* (2013.01); *C08G 77/10* (2013.01); *C08G 77/16* (2013.01)

(58) Field of Classification Search
CPC ................................. C08G 77/06; C08G 77/08
USPC ...................................................... 525/21, 23
See application file for complete search history.

(56) References Cited

U.S. PATENT DOCUMENTS

| | | |
|---|---|---|
| 2,906,734 A | 9/1959 | Clark |
| 3,105,061 A | 9/1963 | Bruner |
| 3,160,301 A | 12/1964 | Milbourne |
| 3,308,208 A | 3/1967 | Seil |
| 4,431,771 A | 2/1984 | Falender et al. |
| 4,448,927 A | 5/1984 | Falender et al. |
| 4,486,567 A | 12/1984 | Bowman et al. |
| 4,508,887 A | 4/1985 | Kohl |
| 4,525,470 A | 6/1985 | Kohl |
| 5,073,618 A | 12/1991 | Westall |
| 5,109,093 A | 4/1992 | Rees et al. |
| 5,109,094 A | 4/1992 | Rees et al. |
| 5,198,518 A | 3/1993 | Yamamoto et al. |
| 5,256,755 A | 10/1993 | Westall |
| 5,344,906 A | 9/1994 | Westall |
| 5,492,992 A | 2/1996 | Gilson |
| 6,737,495 B2 | 5/2004 | Bordone et al. |
| 6,964,753 B2 | 11/2005 | Gilson |
| 7,064,173 B2 | 6/2006 | Rubinsztajn et al. |
| 7,238,768 B2 | 7/2007 | Hupfield et al. |
| 7,612,222 B2 | 11/2009 | Wood |
| 7,759,446 B2 | 7/2010 | Geisberger et al. |
| 8,030,429 B2 | 10/2011 | Sugiura et al. |
| 8,487,037 B2 | 7/2013 | Stammer et al. |
| 8,580,729 B2 | 11/2013 | Davio et al. |
| 8,580,862 B2 | 11/2013 | Barnes et al. |
| 8,735,493 B2 | 5/2014 | Stammer et al. |
| 8,853,309 B2 | 10/2014 | Yano et al. |
| 8,962,716 B2 | 2/2015 | Wakabayashi et al. |
| 9,234,117 B2 | 1/2016 | Yamate et al. |
| 2008/0255322 A1 | 10/2008 | Boisson et al. |
| 2012/0027708 A1 | 2/2012 | Durand et al. |
| 2015/0057412 A1 | 2/2015 | Knott et al. |
| 2016/0145395 A1 | 5/2016 | Surgenor et al. |
| 2017/0107413 A1 | 4/2017 | Wang et al. |

FOREIGN PATENT DOCUMENTS

| | | |
|---|---|---|
| EP | 0314315 | 1/1994 |
| EP | 0909778 | 4/1999 |
| EP | 2155804 | 8/2018 |
| GB | 895 091 | * 5/1962 |
| GB | 2468952 | 9/2010 |

(Continued)

OTHER PUBLICATIONS

Cypryk, et al, Acid-Catalyzed Condensation of Model Oligo(dimethylsiloxanddiol)s; Macromolecules, 1994, 27, 6245-6253.

Yashiro, et al, Polymerization of Cyclosiloxanes by Means of Triflic Acid and Metal Triflates; Macromolecular Chemistry and Physics, 2010, 211, 1311-1321, 2010 WILEY-VCH Verlag GmbH & Co. KGaA, Weinhelm.

Merker et. al., Random and Block Copolymers of Poly(tetramethyl-p-Silphenylene-Siloxane) and Polydimethylsiloxane; J. Poly. Sci. Part A 1964, vol. 2, pp. 31-44.

(Continued)

*Primary Examiner* — Marc S Zimmer

(57) ABSTRACT

A method for making long chain hydroxyl terminated polydiorganosiloxanes with low cyclics content via condensation polymerization employs a selective catalyst. The catalyst includes a salt-anion complex and a free acid.

16 Claims, No Drawings

(56) References Cited

FOREIGN PATENT DOCUMENTS

| WO | 2004000851 | 12/2003 |
| WO | 2006106095 | 10/2006 |
| WO | 2006106360 | 10/2006 |
| WO | 2006106362 | 10/2006 |
| WO | 2006107762 | 10/2006 |
| WO | 2008111598 | 10/2006 |
| WO | 2010108853 | 9/2010 |
| WO | 2013009836 | 1/2013 |
| WO | 2013009840 | 1/2013 |

OTHER PUBLICATIONS

Roundtree, et al., Reactivity of Proton Sources with a Nickel Hydride Complex in Acetonitrile: Implications for the Study of Fuel-Forming Catalysts, Inorganic Chemistry, 2016, 55, 5079-5087.

* cited by examiner

METHOD FOR CONDENSATION POLYMERIZATION OF HYDROXYL-TERMINATED POLYDIORGANOSILOXANES

CROSS REFERENCE TO RELATED APPLICATIONS

This application claims the benefits of U.S. Provisional Patent Application No. 62/760,080 filed 13 Nov. 2018, and U.S. Provisional Patent Application No. 62/722,649 filed 24 Aug. 2018, under 35 U.S.C. § 119 (e). U.S. Provisional Patent Application No. 62/760,080 and U.S. Provisional Patent Application No. 62/722,649 are both hereby incorporated by reference.

TECHNICAL FIELD

This invention relates to a method for condensation polymerization of hydroxyl-terminated polydiorganosiloxanes. The method employs a catalyst that minimizes production of cyclic polydiorganosiloxane by-products.

BACKGROUND

Hydroxyl functional organosiloxane oligomers and short chain polymers may be polymerized via condensation reaction to high molecular weight, high degree of polymerization polymers by polymerization in the presence of a suitable condensation reaction catalyst. Condensation polymerization of hydroxyl functional organosiloxanes occurs with the elimination of water as a by-product. Previous methods employed Brønsted acids, Brønsted bases, or phosphonitriles as catalysts. Although these catalysts can be highly active (to produce product with high DP), they tend to produce large quantities (>1000 ppm) of the cyclic by-product, octamethylcyclotetrasiloxane (D4), in the resulting hydroxyl-functional polydiorganosiloxane product.

PROBLEM TO BE SOLVED

There is an industry need to produce high molecular weight, high degree of polymerization polyorganosiloxanes with lower D4 content than achieved with previous methods, described above.

SUMMARY

A method for polymerizing polydiorganosiloxanes comprises:
1) heating, at a temperature of 50° C. to 200° C., a reaction mixture prepared by mixing starting materials comprising
   A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
   B) a catalyst, at a concentration of 0.001 to 0.01 mol/L based on amount of starting material A), where the catalyst comprises
      B1) a salt-anion complex selected from the group consisting of
         B1i) a quaternary ammonium-fluorinated carboxylate complex,
         B1ii) a quaternary ammonium-sulfonate complex,
         B1iii) a quaternary phosphonium-fluorinated carboxylate complex,
         B1iv) a quaternary phosphonium-sulfonate complex,
         B1v) an imidazolium-fluorinated carboxylate complex, and
         B1vi) an imidazolium-sulfonate complex;
      B2) an acid selected from the group consisting of a fluorinated carboxylic acid and a sulfonic acid; thereby preparing a reaction mixture; and
2) recovering a product from the reaction mixture, where the product has unit formula $[(HO)R_2SiO_{1/2}]_2(R_2SiO_{2/2})_m$, where m>n.

DETAILED DESCRIPTION

The method described above may be performed using a batch reactor or a continuous reactor, such as a gas liquid reactor. Residence time depends on various factors including the temperature selected and the type of reactor. However, step 1) may be performed by heating at a temperature of 50° C. to 200° C., alternatively 50° C. to 150° C., alternatively 90° C. to 130° C., and alternatively 110° C. for at least 30 seconds, alternatively for 30 seconds to 2 hours. The method may be performed at ambient pressure and does not require an inert atmosphere. However, conditions that enable by-product water to be removed may facilitate increasing DP of the product or improving selectivity (minimizing D4 in the product), or both. Therefore, the method may further comprise removing water during and/or after step 1). Step 2) may be performed by a method comprising filtering, stripping and/or distilling the reaction mixture.

The method described above can produce a hydroxyl-terminated polydiorganosiloxane having a DP higher than that of starting material A) and a relatively low D4 content (i.e., D4 content lower than that produced using a phosphonitrilic catalyst). For example, D4 content in the product may be <800 ppm, alternatively <500 ppm, alternatively <400 ppm, and alternatively <350 ppm, and alternatively <300 ppm. The minimum amount of D4 may be 0, alternatively 100 ppm. And, when starting material A) has a DP <50, DP of the product may be >200, alternatively >400, alternatively >500, alternatively >700, alternatively >800, and alternatively >1000. Alternatively, when starting material A) has a DP <50, DP of the product may be 100 to 1100, alternatively 400 to 1100, alternatively 500 to 1100.

Starting Material A) Polydiorganosiloxane

In the method described above, starting material A) is a polydiorganosiloxane comprising unit formula A-1): $[(HO)R_2SiO_{1/2}]_2(R_2SiO_{2/2})_n$.

In unit formula A-1), R is an independently selected monovalent hydrocarbon group of 1 to 18 carbon atoms. Suitable monovalent hydrocarbon groups for R may be selected from the group consisting of alkyl, alkenyl, and aryl. Exemplary alkyl groups include methyl, ethyl, propyl (including n-propyl and iso-propyl), butyl (including n-butyl, t-butyl, iso-butyl and sec-butyl), and hexyl groups (including branched and linear isomers thereof). Exemplary alkenyl groups include vinyl, allyl, and hexenyl (including branched and linear isomers thereof). Exemplary aryl groups include phenyl, tolyl, xylyl, naphthyl, and benzyl. Alternatively, each alkyl may be methyl, each alkenyl may be selected from the group consisting of vinyl, allyl, and hexenyl, and each aryl may be phenyl. Alternatively, 50% to 100%, alternatively 80% to 100%, and alternatively 90% to 100% of all instances of R are alkyl groups such as methyl. Alternatively, the R groups on starting material A) may be methyl and phenyl. Alternatively, the R groups on starting material A) may be methyl and vinyl.

In unit formula A-1), subscript n is 0 to 2000. Alternatively, subscript n may be 5 to 2000, alternatively 5 to 200, alternatively 10 to 150, alternatively 15 to 100, alternatively 20 to 50, and alternatively 25 to 35.

One skilled in the art would recognize that starting material A) may be substantially linear, alternatively starting material A) is linear. Furthermore, starting material A) may contain a small number of additional siloxane units, such as those of formula $(HORSiO_{2/2})$, $(RSiO_{3/2})$ and/or $(SiO_{4/2})$ provided that starting material A) is substantially linear. Examples of starting material A) include bis-hydroxyl terminated polydimethylsiloxane. Suitable polydiorganosiloxanes for starting material (A) may be prepared by methods known in the art such as the addition of diorganodichlorosilanes to a water/solvent mixture to yield a mixture of low molecular weight hydroxyl end-blocked polydiorganosiloxanes and cyclic siloxanes in solvent. The mixture may be purified to separate hydroxyl end-blocked polydiorganosiloxanes and cyclic polysiloxanes.

Starting Material B) Catalyst

Starting material B) is the catalyst used in the method described above. Starting material B) comprises: B1) a salt-anion complex and B2) an acid. The salt-anion complex is selected from the group consisting of: B1i) a quaternary ammonium-fluorinated carboxylate complex, B1ii) a quaternary ammonium-sulfonate complex, B1iii) a quaternary phosphonium-fluorinated carboxylate complex, B1iv) a quaternary phosphonium-sulfonate complex, B1v) an imidazolium-fluorinated carboxylate complex, and B1vi) an imidazolium-sulfonate complex.

Starting material B1i) is a quaternary ammonium-fluorinated carboxylate complex, such as a tetra alkyl ammonium-fluoroalkyl carboxylate complex. The quaternary ammonium cation in this complex may be tetramethyl ammonium, tetraethyl ammonium, tetra butyl ammonium, such as tetra-n-butyl ammonium. The fluorinated carboxylate anion in this complex may have formula

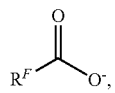

where $R^F$ is a fluoroalkyl group of 1 to 10 carbon atoms, alternatively 1 to 6 carbon atoms, alternatively 1 to 4 carbon atoms, and alternatively 1 to 2 carbon atoms. Examples of fluoroalkyl groups for $R^F$ include trifluoromethyl or 3,3,3-trifluoropropyl, alternatively trifluoromethyl. Quaternary ammonium-fluorinated carboxylate complexes are commercially available from Sigma-Aldrich.

Starting material B1ii) is a quaternary ammonium-sulfonate complex, such as a tetra alkyl ammonium-alkyl sulfonate complex. The quaternary ammonium cation in this complex may be tetramethyl ammonium, tetraethyl ammonium, tetra butyl ammonium, such as tetra-n-butyl ammonium. The sulfonate anion in this complex may have formula

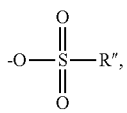

where R" is an alkyl group of 1 to 10 carbon atoms, alternatively 1 to 6 carbon atoms, alternatively 1 to 4 carbon atoms. Suitable alkyl groups for R" are exemplified by methyl, ethyl, or propyl; alternatively methyl. Quaternary ammonium-sulfonate complexes are commercially available from Sigma-Aldrich.

Starting material B1iii) is a quaternary phosphonium-fluorinated carboxylate complex, such as a tetra alkyl phosphonium-fluoroalkyl carboxylate complex. The quaternary phosphonium cation in this complex may be tetramethyl phosphonium, tetraethyl phosphonium, tetra butyl phosphonium, such as tetra-n-butyl phosphonium. The fluorinated carboxylate anion in this complex may have formula

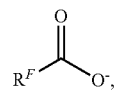

where $R^F$ is a fluoroalkyl group of 1 to 10 carbon atoms, alternatively 1 to 6 carbon atoms, alternatively 1 to 4 carbon atoms, and alternatively 1 to 2 carbon atoms. Examples of fluoroalkyl groups for $R^F$ include trifluoromethyl or 3,3,3-trifluoropropyl, alternatively trifluoromethyl. Quaternary phosphonium-fluorinated carboxylate complexes may be prepared by methods known in the art, such as that disclosed in Rountree, E. S.; Dempsey, J. L. *Inorg. Chem.* 2016, 55, 5079.

Starting material B1iv) is a quaternary phosphonium-sulfonate complex, such as a tetra alkyl phosphonium-alkyl sulfonate complex. The quaternary phosphonium cation in this complex may be tetramethyl phosphonium, tetraethyl phosphonium, tetra butyl phosphonium, such as tetra-n-butyl phosphonium. The sulfonate anion in this complex may have formula

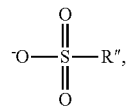

where R" is an alkyl group of 1 to 10 carbon atoms, alternatively 1 to 6 carbon atoms, alternatively 1 to 4 carbon atoms. Suitable alkyl groups for R" are exemplified by methyl, ethyl, or propyl; alternatively methyl. Quaternary phosphonium-sulfonate complexes are commercially available from Sigma-Aldrich.

Starting material B1v) is an imidazolium-fluorinated carboxylate complex, such as an alkyl imidazolium-fluoroalkyl carboxylate complex. The imidazolium anion in this complex may have formula

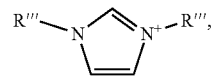

where each R''' is an independently selected alkyl group of 1 to 10 carbon atoms, alternatively 1 to 6 carbon atoms, alternatively 1 to 4 carbon atoms and alternatively 1 to 2 carbon atoms. Alternatively, each R''' may be methyl or ethyl. Alternatively, one of R''' may be methyl and the other of R''' may be ethyl. The fluorinated carboxylate anion in this complex may have formula

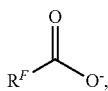

where $R^F$ is a fluoroalkyl group of 1 to 10 carbon atoms, alternatively 1 to 6 carbon atoms, alternatively 1 to 4 carbon atoms, and alternatively 1 to 2 carbon atoms. Examples of fluoroalkyl groups for $R^F$ include trifluoromethyl or 3,3,3-trifluoropropyl, alternatively trifluoromethyl. Imidazolium-fluorinated carboxylate complexes are commercially available from Sigma-Aldrich.

Starting material B1vi) is an imidazolium-sulfonate complex. The imidazolium anion in this complex may have formula

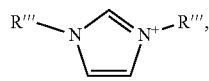

where each R''' is an independently selected alkyl group of 1 to 10 carbon atoms, alternatively 1 to 6 carbon atoms, alternatively 1 to 4 carbon atoms and alternatively 1 to 2 carbon atoms. Alternatively, each R''' may be methyl or ethyl. Alternatively, one of R''' may be methyl and the other of R''' may be ethyl. The sulfonate anion in this complex may have formula

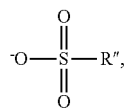

where R'' is an alkyl group of 1 to 10 carbon atoms, alternatively 1 to 6 carbon atoms, alternatively 1 to 4 carbon atoms. Suitable alkyl groups for R'' are exemplified by methyl, ethyl, or propyl; alternatively methyl. Imidazolium-sulfonate complexes are commercially available from Sigma-Aldrich.

Starting material B1) is used in an amount effective to catalyze condensation polymerization of starting material A). The exact amount depends on various factors including the species selected for starting material B1) and the selection of starting material B2), however, starting material B1) may be used in an amount of 0.005 mol/L to 0.1 mol/L, based on the amount of starting material A). Without wishing to be bound by theory, it is thought that if the amount of starting material B1) is too low (e.g., 0.0001 mol/L or lower when residence time in a batch reactor is 2 hours or less), catalytic activity will be insufficient.

Starting material B2) the acid is selected from the group consisting of B2i) a fluorinated carboxylic acid and B2ii) a sulfonic acid. Suitable fluorinated carboxylic acids are exemplified by fluoroalkyl acetic acids such as trifluoroacetic acid; 3,3,3-trifluoropropionic acid; 3,3,3-trifluoro-2,2-dimethylpropionic acid; 3,3,3-trifluoro-2-(trifluoromethyl)propionic acid; 4,4,4-trifluorobutyric acid; and 2-methyl, 4,4,4-trifluorobutyric acid. Alternatively, the fluorinated carboxylic acid may be trifluoroacetic acid. Fluorinated carboxylic acids are commercially available, e.g., from Sigma Aldrich.

Alternatively, starting material B2) may comprise a sulfonic acid, such as an alkyl sulfonic acid, e.g., methane sulfonic acid, ethane sulfonic acid, 1-propane sulfonic acid, and t-butyl sulfonic acid. Alternatively, the sulfonic acid for B2) may comprise methane sulfonic acid. Sulfonic acids are commercially available, e.g., from Sigma Aldrich.

The amount of starting material B2) depends on various factors including the selection and amount of starting material B1), however, the amount of starting material B2) may be 1.5 moles to 10 moles, alternatively 1.5 moles to 2 moles, per mole of starting material B1).

TABLE 1

Salt - Anion Complex & Acid Examples

| Number | Catalyst | | |
|---|---|---|---|
| 1 | n-Bu₄N⁺ | ⁻O-S(=O)₂-CH₃ | (HO-S(=O)₂-CH₃) |
| 2 | n-Bu₄N⁺ | ⁻O-C(=O)-CF₃ | (F₃C-C(=O)-OH) |
| 3 | n-Bu₄N⁺ | ⁻O-C(=O)-CF₃ | (HO-S(=O)₂-CH₃) |
| 4 | n-Bu₄N⁺ | ⁻O-S(=O)₂-CH₃ | (F₃C-C(=O)-OH) |

TABLE 1-continued

Salt - Anion Complex & Acid Examples

| Number | Catalyst |
|---|---|
| 5 | 1-methyl-3-ethylimidazolium / trifluoroacetate (CF$_3$COO$^-$) / (trifluoroacetic acid CF$_3$COOH) |
| 6 | tetra-n-butylphosphonium / trifluoroacetate (CF$_3$COO$^-$) / (trifluoroacetic acid CF$_3$COOH) |
| 12 | tetra-n-butylphosphonium / methanesulfonate (CH$_3$SO$_3^-$) / (methanesulfonic acid CH$_3$SO$_3$H) |
| P1 | tetra-n-butylphosphonium / trifluoroacetate (CF$_3$COO$^-$) / (methanesulfonic acid CH$_3$SO$_3$H) |
| P2 | tetra-n-butylphosphonium / methanesulfonate (CH$_3$SO$_3^-$) / (trifluoroacetic acid CF$_3$COOH) |
| 11 | 1-methyl-3-ethylimidazolium / methanesulfonate (CH$_3$SO$_3^-$) / (methanesulfonic acid CH$_3$SO$_3$H) |
| P3 | 1-methyl-3-ethylimidazolium / trifluoroacetate (CF$_3$COO$^-$) / (methanesulfonic acid CH$_3$SO$_3$H) |
| P4 | 1-methyl-3-ethylimidazolium / methanesulfonate (CH$_3$SO$_3^-$) / (trifluoroacetic acid CF$_3$COOH) |

Starting Material C) Solvent

Starting material C), a solvent, may optionally be used in the method described herein. The solvent may be used to deliver one or more of the other starting materials. For example, starting material B1), starting material B2), or both may be dissolved in a solvent before combining with starting material A). The solvent may be an aprotic solvent, such as tetrahydrofuran, toluene, or dichloromethane. Alternatively, the solvent may be a low molecular weight trimethylsiloxy-terminated polydimethylsiloxane, such as an OS Fluid, which is commercially available from Dow Silicones Corporation of Midland, Mich., U.S.A. The solvent may be used to deliver one or more starting materials (i.e., one or more starting materials may be dissolved in solvent before step 1), the reaction may proceed in solvent, or both. The amount of solvent depends on various factors including the type and amount of starting materials A) and B) selected and whether one or more starting materials is being delivered in a solvent, or whether the reaction will proceed in a solvent. For example, when present, the amount may be sufficient to form a reaction mixture with a concentration of starting material A) of 0.1 M-0.5 M.

Product

The product of the method described herein is a bis-hydroxyl terminated polydiorganosiloxane of unit formula [(HO)R$_2$SiO$_{1/2}$]$_2$(R$_2$SiO$_{2/2}$)$_m$, where R is as described above for starting material A), and subscript m has a value greater than subscript n in starting material A). For example, in the product described above, subscript m may have a value ranging from (n+100) to (n+600), alternatively (n+100) to (n+800), alternatively (n+100) to (n+900), alternatively (n+100) to (n+1000), alternatively (n+200) to (n+1100).

EXAMPLES

These examples are intended to illustrate some embodiments of the invention and should not be interpreted as limiting the scope of the invention set forth in the claims. Compounds tested are shown in Table 2, below.

TABLE 2

Compounds

| Number | Compound |
|---|---|
| 1 | (n-Bu)₄N⁺ · ⁻O-S(=O)₂-CH₃ (HO-S(=O)₂-CH₃) |
| 2 | (n-Bu)₄N⁺ · ⁻O-C(=O)-CF₃ (F₃C-C(=O)-OH) |
| 3 | (n-Bu)₄N⁺ · ⁻O-C(=O)-CF₃ (HO-S(=O)₂-CH₃) |
| 4 | (n-Bu)₄N⁺ · ⁻O-S(=O)₂-CH₃ (F₃C-C(=O)-OH) |
| 5 | 1-methyl-3-ethylimidazolium · ⁻O-C(=O)-CF₃ (F₃C-C(=O)-OH) |
| 6 | (n-Bu)₄P⁺ · ⁻O-C(=O)-CF₃ (F₃C-C(=O)-OH) |
| Comparative 7 | (n-Bu)₄N⁺ · ⁻O-C(=O)-CH₃ (HO-C(=O)-CH₃) (not fluorinated) |
| Comparative 8 | HO-C(=O)-CH₃ (no B1) |
| Comparative 9 | (n-Bu)₄N⁺ · ⁻O-C(=O)-CH₃ (no B2) |
| Comparative 10 | [Cl₃P=N-PCl₂-N=PCl₃]⁺ [P$_x$Cl$_{5x+1}$]⁻ ; [Cl₃P=N-PCl₂-N=PCl₂-N=PCl₃]⁺ [P$_x$Cl$_{5x+1}$]⁻ ; x = 0, 1 |
| 11 | 1-methyl-3-ethylimidazolium · ⁻O-S(=O)₂-CH₃ (HO-S(=O)₂-CH₃) |

TABLE 2-continued

Compounds

| Number | Compound |
|---|---|
| 12 | 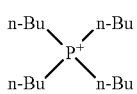 |
| Comparative 13 |  (not fluorinated) |
| Comparative 14 | 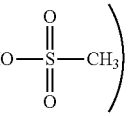 (not fluorinated) |

Reference Example 1—General Procedure

Samples were prepared as follows. A 40 mL glass vial was filled with 5 g of bis-hydroxy terminated polydimethylsiloxane having an average DP of 35 and equipped with a stir bar. The bis-hydroxy terminated polydimethylsiloxane was obtained from Dow Silicones Corporation of Midland, Mich., USA. The vial was placed on a heating block 110° C., and a compound at a loading (selection and amount in Table 1) was added to the bis-hydroxy terminated polydimethylsiloxane to initiate polymerization. The vial was capped after addition of the compound, and stirring was continued for 2 hr on the heating block at 110° C. After the 2 hr, the vials were removed from the heating block, and GPC samples were prepared. Analysis of the resulting crude reaction mixture by GPC indicated a final degree of polymerization, while headspace GC measured residual octamethylcyclotetrasiloxane. The compound tested, loading of the compound, Mn, Mw, and DP of the bis-hydroxy terminated polydimethylsiloxane prepared by the method, and residual D4 in the bis-hydroxy terminated polydimethylsiloxane prepared by the method are shown below in Table 3.

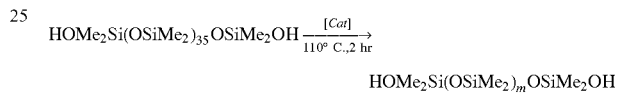

$$HOMe_2Si(OSiMe_2)_{35}OSiMe_2OH \xrightarrow[110° C., 2 hr]{[Cat]}$$

$$HOMe_2Si(OSiMe_2)_mOSiMe_2OH$$

TABLE 3

| Compound | Loading (M) | Mn | Mw | DP | PDI | Conversion (%) | D4 (ppm) | Example type |
|---|---|---|---|---|---|---|---|---|
| 1 | $1*10^{-3}$ | 54673 | 101794 | 732 | 1.9 | 95 | 769 | Inventive |
| 2 | $1*10^{-3}$ | 61178 | 115705 | 819 | 1.9 | 96 | 307 | Inventive |
| 3 | $1*10^{-3}$ | 32257 | 57313 | 432 | 1.8 | 92 | 225 | Inventive |
| 4 | $1*10^{-3}$ | 38685 | 66464 | 518 | 1.7 | 93 | 222 | Inventive |
| 5 | $1*10^{-3}$ | 19558 | 36178 | 262 | 1.8 | 87 | 142 | Inventive |
| 6 | $1*10^{-3}$ | 81223 | 155273 | 1088 | 1.9 | 97 | 231 | Inventive |
| 7 | $1*10^{-3}$ | 2634 | 4817 | 35 | 1.8 | 1 | 57 | Comparative |
| 8 | $1*10^{-2}$ | 2351 | 4231 | 31 | 1.8 | −11 | 29 | Comparative |
| 9 | $1*10^{-2}$ | 2141 | 4082 | 29 | 1.9 | −22 | 174 | Comparative |
| 10 | $1*10^{-5}$ | 38523 | 75672 | 516 | 2.0 | 93 | 3668 | Comparative |
| 11 | $1*10^{-3}$ | 27652 | 48088 | 370 | 1.7 | 91 | 367 | Inventive |
| 12 | $1*10^{-3}$ | 98204 | 178699 | 1315 | 1.8 | 97 | 930 | Inventive |
| 13 | $1*10^{-3}$ | 2973 | 6629 | 40 | 2.2 | 12 | 65 | Comparative |
| 14 | $1*10^{-3}$ | 3581 | 6987 | 48 | 2.0 | 27 | 59 | Comparative |

Comparative Example 10 showed that a conventional phosphonitrilic chloride catalyst produced high levels of D4 as a by-product of polymerization under the conditions tested. Comparative examples 7, 9, 13 and 14 and examples 2, 5 and 6 show that when a quaternary ammonium, imidazolium, or quaternary phosphonium-fluorinated carboxylate complex and a fluorinated carboxylic acid were used as the catalyst, dramatically improved polymerization (as shown by increase in DP and % conversion) were achieved, as compared to a catalyst including a quaternary ammonium-carboxylate (that was not fluorinated) complex under the conditions tested. Example 6 showed that good conversion, high DP and low D4 were achieved using a quaternary phosphonium-fluorinated carboxylate complex and a fluorinated carboxylic acid produced good conversion, high DP, and low D4 under the conditions tested. Example 5 showed that an imidazolium-fluorinated carboxylate complex and fluorinated carboxylic acid catalyzed polymerization as shown by an increase in DP with low D4 content under the conditions tested.

Reference Example 2—Molecular Distribution

Molecular distribution of starting materials was analyzed by GPC equipped with triple detector array (Refractive Index, Right Angle Light Scattering, and Viscometer). 0.5% of samples were used for GPC analysis. Mw of Polystyrene standards were in the range of 580 to 100,000, and a $3^{rd}$ order calibration curve was used for molecular weight determination. Both samples and standards were diluted in HPLC grade ethyl acetate.

Reference Example 3—D4 Concentration

D4 Concentration measurements were made using the following instruments, procedures, and quantitation methods.

GC-HP 6890

Gradient: 50° C. (1 min)-220° C. @ 10° C./min (no hold); Inlet: Split 1:20, 9.68 psi, 150° C.; Flow: 2 mL/min FID: Hydrogen 40 mL/min, Air 450 mL/min, Makeup 45 mL/min, Temperature 260° C.; Column: RTX-1, 30 m/320 μm/0.25 μm Headspace Unit—Perkin-Elmer TurboMatrix 40

Incubation: 120° C. for 10 min with shaking; Syringe: 125° C.; Transfer Line: 130° C.; Pressurize: 3 min; Withdraw: 0.5 min; Column pressure: 20 psi; Injection: 0.15 min/0.3 mL; GC cycle: 25 min Sample Preparation Internal standards were prepared to be 0.01% dodecane by weight in Fisher Brand 19 fluid vacuum oil. 1 mL of internal standard solution was added to a 20 mL headspace vial (with Eppendorf repeater pipet). 100 mg of D4 standard (usually 100 ppm standard used) or 100 mg of experimental sample was added to the headspace vial.

Quantitation:

Quantitation of the D4 content was by the single point internal standard method. A relative response factor (RRF) of D4 relative to dodecane was established and updated every time a new batch of internal standard solution was prepared. The amount of D4 in the samples was determined within the Thermo Atlas data system according to an equation of the same type as the one below:

$$Conc_{D4} = \frac{RRF * Area_{D4}}{Area_{dodecane} * weight_{sample}}.$$

Example 4

The general procedure described above in reference example 1 is repeated, except using a quaternary phosphonium-sulfonate complex with a sulfonic acid as catalyst (shown as 12 in Table 1) as catalyst.

Prophetic Example 5

The general procedure described above in reference example 1 is repeated, except using a quaternary phosphonium-sulfonate complex with a fluorinated carboxylic acid (shown as P1 in Table 1) as catalyst.

Example 6

The general procedure described above in reference example 1 is repeated, except using an imidazolium-sulfonate complex with a sulfonic acid as catalyst (shown as 11 in Table 1) as catalyst.

Prophetic Example 7

The general procedure described above in reference example 1 is repeated, except using an imidazolium-sulfonate complex with a fluorinated carboxylic acid as catalyst (shown as P4 in Table 1) as catalyst.

Industrial Applicability

Bis-hydroxy terminated silicone polymers produced by Dow Silicones Corporation can contain approximately 1000 ppm D4 as a by-product. The inventors surprisingly found that several combinations of salt-anion complex and acid catalyze condensation of hydroxyl-terminated polydiorganosiloxanes and produce significantly less octamethylcyclotetrasiloxane than the other catalysts under the same conditions. These benefits were achievable in a method performed under ambient pressure, in the presence of oxygen (from air) and did not require solvent.

Definitions and Usage of Terms

All amounts, ratios, and percentages are by weight unless otherwise indicated. The SUMMARY and the ABSTRACT are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 0 to 2000 includes not only the range of 0 to 2000, but also 1, 2, 5, 20, 25, 30, 35, 40, 45, 50, 55, 60, 65, 70, 75, 80, 90, 100, 200, 300, 400, 500, 600, 800, 1000, 1250, 1500, 1750, and 2000 individually, as well as any other number subsumed in the range. Furthermore, disclosure of a range of, for example, 0 to 2000 includes the subsets of, for example, for example, 10 to 1500, 16 to 750, 20 to 450, 5 to 50, and 10 to 40, as well as any other subset subsumed in the range. Table 5, below, defines abbreviations used throughout this application.

TABLE 5

| Abbreviations | |
|---|---|
| Abbreviation | Description |
| Bu | butyl |
| ° C. | degrees Celsius |
| D4 | octamethylcyclotetrasiloxane |
| DP | degree of polymerization |
| Et | ethyl |
| g | grams |
| GC | gas chromatography |
| GPC | gel permeation chromatography |
| hr | hours |
| HPLC | high performance liquid chromatography |
| M | molar |
| Me | methyl |
| min | minutes |
| mL | milliliter |
| Mn | number average molecular weight |
| Mw | weight average molecular weight |
| ppm | parts per million |

TABLE 5-continued

Abbreviations

| Abbreviation | Description |
| --- | --- |
| THF | tetrahydrofuran |
| μL | microliters |

Embodiments of the Invention

In a first embodiment, method for polymerizing polydiorganosiloxanes comprises:
1) heating, at a temperature of 50° C. to 150° C., a reaction mixture prepared by mixing starting materials comprising
   A) a polydiorganosiloxane of average unit formula [(HO)R$_2$SiO$_{1/2}$]$_2$(R$_2$SiO$_{2/2}$)$_n$, where subscript n is 0 to 2000, and each R is an independently selected monovalent hydrocarbon group of 1 to 18 carbon atoms; and
   B) a catalyst, at a concentration of 0.001 to 0.01 mol/L based on amount of starting material A), where the catalyst comprises
      B1) a salt-anion complex selected from the group consisting of
         B1i) a quaternary ammonium-fluorinated carboxylate complex, and
         B1ii) a quaternary ammonium-sulfonate complex; and
      B2) an acid selected from the group consisting of a fluorinated carboxylic acid and a sulfonic acid; thereby preparing a reaction mixture; and
2) recovering a product from the reaction mixture, where the product has unit formula [(HO)R$_2$SiO$_{1/2}$]$_2$(R$_2$SiO$_{2/2}$)$_m$, where m>n.

In a second embodiment, in the method of the first embodiment, the quaternary ammonium in starting material B1i) or B1ii) is tetra-n-butyl ammonium.

In a third embodiment, in the method of any one of the first to third embodiments, the fluorinated carboxylate anion in B1i) is

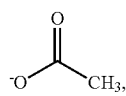

and the sulfonate anion in B1ii)

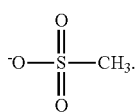

In a fourth embodiment, in the method of any one of the first to third embodiments, the fluorinated carboxylic acid for starting material B2) is

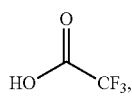

and the sulfonic acid for starting material B2) is

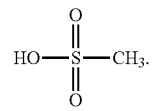

In a fifth embodiment, in the method of any one of the first to third embodiments, B) the catalyst is selected from the group consisting of:

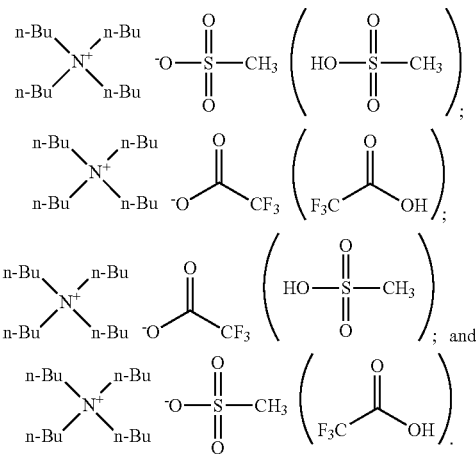

where n-Bu represents a normal-butyl group, Me represents a methyl group, and Et represents an ethyl group.

In a sixth embodiment, in the method of any one of the first to fifth embodiments, when B1) is B1i) the quaternary ammonium-fluorinated carboxylate complex, then B2) is the sulfonic acid.

In a seventh embodiment, in the method of any one of the first to third embodiments or the fifth embodiment, when B1) is the quaternary ammonium-sulfonate complex, then B2) is the fluorinated carboxylic acid.

In an eighth embodiment, a method for polymerizing polydiorganosiloxanes comprises:
1) heating, at a temperature of 50° C. to 150° C., a reaction mixture prepared by mixing starting materials comprising
   A) a polydiorganosiloxane of average unit formula [(HO)R$_2$SiO$_{1/2}$]$_2$(R$_2$SiO$_{2/2}$)$_n$, where subscript n is 0 to 2000, and each R is an independently selected monovalent hydrocarbon group of 1 to 18 carbon atoms; and
   B) a catalyst, at a concentration of 0.001 to 0.01 mol/L based on amount of starting material A), where the catalyst comprises
      B1) a salt-anion complex selected from the group consisting of
         B1iii) a quaternary phosphonium-fluorinated carboxylate complex, and
         B1iv) a quaternary phosphonium-sulfonate complex; and
      B2) an acid selected from the group consisting of a fluorinated carboxylic acid and a sulfonic acid; thereby preparing a reaction mixture; and
2) recovering a product from the reaction mixture, where the product has unit formula [(HO)R$_2$SiO$_{1/2}$]$_2$(R$_2$SiO$_{2/2}$)$_m$, where m>n.

In a ninth embodiment, in the method of the eighth embodiment, the quaternary phosphonium in starting material B1iii) or B1iv) is tetra-n-butyl phosphonium.

In a tenth embodiment, in the method of the eighth or ninth embodiments, the fluorinated carboxylate anion in B1iii) has formula

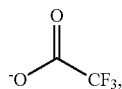

and the sulfonate anion in B1iv) is

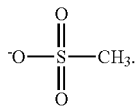

In an eleventh embodiment, in the method of any one of the eighth to tenth embodiments, the fluorinated carboxylic acid for starting material B2) is

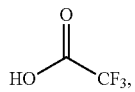

and the sulfonic acid for starting material B2) is

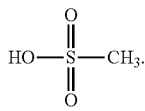

In a twelfth embodiment, in the method of any one of the eighth to eleventh embodiments, B) the catalyst is

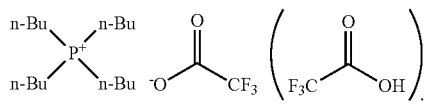

where n-Bu represents a normal-butyl group, Me represents a methyl group, and Et represents an ethyl group.

In a thirteenth embodiment, a method for polymerizing polydiorganosiloxanes comprises:
1) heating, at a temperature of 50° C. to 150° C., a reaction mixture prepared by mixing starting materials comprising
   A) a polydiorganosiloxane of average unit formula [(HO)$R_2SiO_{1/2}]_2(R_2SiO_{2/2})_n$, where subscript n is 0 to 2000, and each R is an independently selected monovalent hydrocarbon group of 1 to 18 carbon atoms; and
   B) a catalyst, at a concentration of 0.001 to 0.01 mol/L based on amount of starting material A), where the catalyst comprises
      B1v) an imidazolium-fluorinated carboxylate complex;
      B2) an acid selected from the group consisting of a fluorinated carboxylic acid and a sulfonic acid; thereby preparing a reaction mixture; and
2) recovering a product from the reaction mixture, where the product has unit formula [(HO)$R_2SiO_{1/2}]_2(R_2SiO_{2/2})_m$, where m>n.

In a fourteenth embodiment, in the method of the thirteenth embodiment, the imidazolium in starting material B1v) is

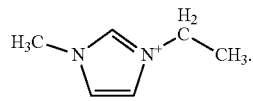

In a fifteenth embodiment, in the method of the thirteenth or the fourteenth embodiment, the fluorinated carboxylate anion in B1v) is

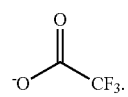

In a sixteenth embodiment, in the method of any one of the thirteenth to fifteenth embodiments, the fluorinated carboxylic acid for starting material B2) is

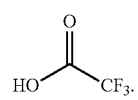

In a seventeenth embodiment, in the method of any one of the thirteenth to the sixteenth embodiments, the catalyst is

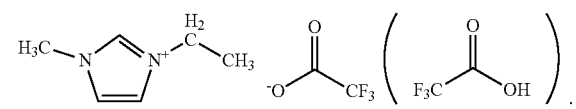

where n-Bu represents a normal-butyl group, Me represents a methyl group, and Et represents an ethyl group.

In an eighteenth embodiment, in the method of any one of the preceding embodiments, starting material C), a solvent, is present.

In a nineteenth embodiment, in the method the eighteenth embodiment, the solvent is selected from the group consisting of aprotic solvents and trimethylsiloxy-terminated polydimethylsiloxanes.

In a twentieth embodiment, in the method of the nineteenth embodiment, the solvent is selected from the group consisting of tetrahydrofuran, toluene and dichloromethane.

In a twenty-first embodiment, in the method of any one of the preceding embodiments, step 1) is performed by heating at a temperature of 80° C. to 105° C. for 30 seconds to 2 hours.

In a twenty-second embodiment, in the method of any one of the preceding embodiments, the method further comprises removing water during and/or after step 1).

In a twenty-third embodiment, in any one of the preceding embodiments, the method further comprises heating starting material A) to a temperature of at least 100° C. before step 1), thereby removing water.

In a twenty-fourth embodiment, in the method of any one of the preceding embodiments, any one of the preceding embodiments, step 2) is performed by a method comprising filtering, stripping and/or distilling the reaction mixture.

In a twenty-fifth embodiment, a method for polymerizing polydiorganosiloxanes comprises:

1) heating, at a temperature of 50° C. to 150° C., a reaction mixture prepared by mixing starting materials comprising
   A) a polydiorganosiloxane of average unit formula [(HO)R$_2$SiO$_{1/2}$]$_2$(R$_2$SiO$_{2/2}$)$_n$, where subscript n is 0 to 2000, and each R is an independently selected monovalent hydrocarbon group of 1 to 18 carbon atoms; and
   B) a catalyst, at a concentration of 0.001 to 0.01 mol/L based on amount of starting material A), where the catalyst comprises
      B1) a salt-anion complex selected from the group consisting of
         B1v) an imidazolium-fluorinated carboxylate complex, and
         B1vi) an imidazolium-sulfonate complex; and
      B2) an acid selected from the group consisting of a fluorinated carboxylic acid and a sulfonic acid; thereby preparing a reaction mixture; and
2) recovering a product from the reaction mixture, where the product has unit formula [(HO)R$_2$SiO$_{1/2}$]$_2$(R$_2$SiO$_{2/2}$)$_m$, where m>n.

In a twenty-sixth embodiment, in the method of the twenty-fifth embodiment, the imidazolium cation in starting material B1v) and B1vi) is

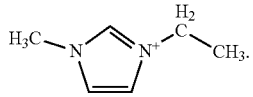

In a twenty-seventh embodiment, in the method of the twenty-fifth or twenty sixth embodiments, the fluorinated carboxylate anion is fluorinated carboxylate anion in B1v) is

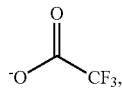

and the sulfonate anion in B1vi)

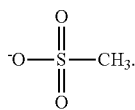

In a twenty-eighth embodiment, in the method of any one of the twenty-fifth to twenty-seventh embodiments, the fluorinated carboxylic acid for starting material B2) is

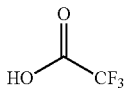

and the sulfonic acid for starting material B2) is

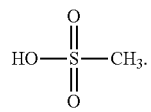

In a twenty-ninth embodiment, in the method of any one of the twenty-fifth to the twenty-eight embodiments, the catalyst is selected from the group consisting of:

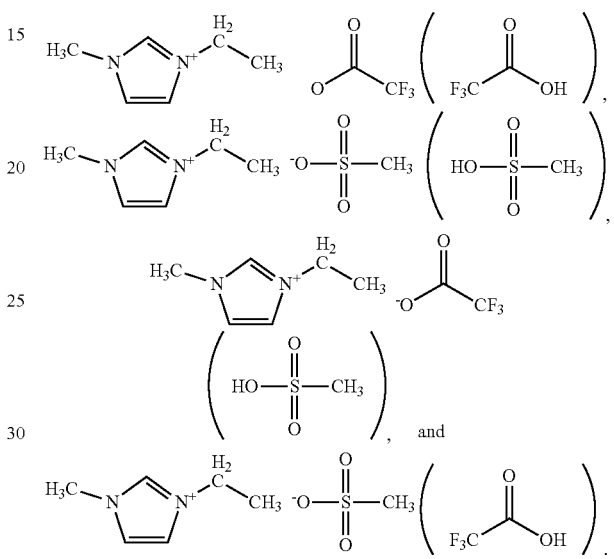

The invention claimed is:
1. A method for polymerizing polydiorganosiloxanes comprising:
   1) heating, at a temperature of 50° C. to 150° C., a reaction mixture prepared by mixing starting materials comprising
      A) a polydiorganosiloxane of average unit formula [(HO)R$_2$SiO$_{1/2}$]$_2$(R$_2$SiO$_{2/2}$)$_n$, where subscript n is 0 to 2000, and each R is an independently selected monovalent hydrocarbon group of 1 to 18 carbon atoms; and
      B) a catalyst, at a concentration of 0.001 to 0.01 mol/L based on amount of starting material A), where the catalyst comprises
         B1) a salt-anion complex selected from the group consisting of
            B1i) a quaternary ammonium-fluorinated carboxylate complex,
            B1ii) a quaternary ammonium-sulfonate complex,
            B1iii) a quaternary phosphonium-fluorinated carboxylate complex,
            B1iv) a quaternary phosphonium-sulfonate complex,
            B1v) an imidazolium-fluorinated carboxylate complex, and
            B1vi) an imidazolium-sulfonate complex;
         B2) an acid selected from the group consisting of a fluorinated carboxylic acid and a sulfonic acid; thereby preparing a reaction mixture; and

2) recovering a product from the reaction mixture, where the product has unit formula $[(HO)R_2SiO_{1/2}]_2(R_2SiO_{2/2})_m$, where m>n.

2. The method of claim 1, where each R is independently selected from the group consisting of alkyl, alkenyl, and aryl.

3. The method of claim 1, where subscript n is 10 to 150.

4. The method of claim 1, where the quaternary ammonium in starting material B1i) or B1ii) is tetra-n-butyl ammonium; the quaternary phosphonium in starting material B1iii) or B1iv) is tetra-n-butyl phosphonium; and the imidazolium in starting material B1v) or B1vi) is

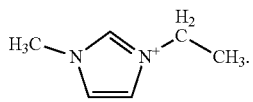

5. The method of claim 1, where the fluorinated carboxylate is

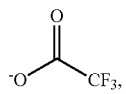

and the sulfonate is

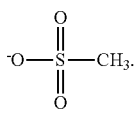

6. The method of claim 1, where the fluorinated carboxylic acid for starting material B2) is

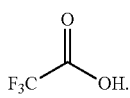

7. The method of claim 1, where the sulfonic acid for starting material B2) is

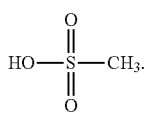

8. The method of claim 1, where
B) the catalyst is selected from the group consisting of:

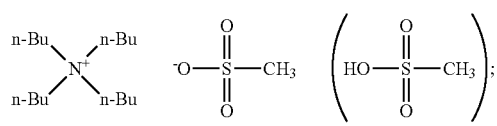

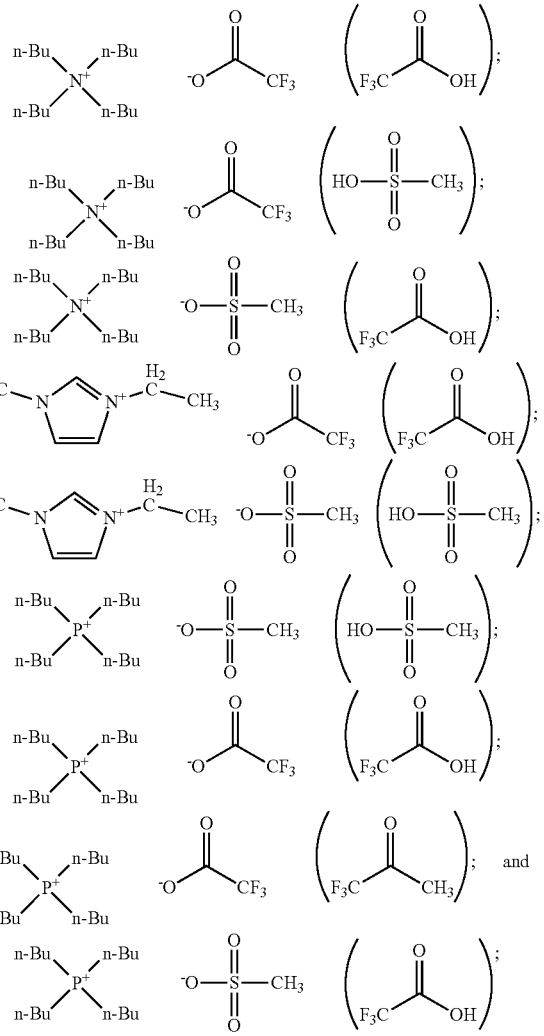

where n-Bu represents a normal-butyl group.

9. The method of claim 1, where starting material C), a solvent, is present.

10. The method of claim 9, where the solvent is selected from the group consisting of aprotic solvents and trimethylsiloxy-terminated polydimethylsiloxanes.

11. The method of claim 1, where step 1) is performed by heating at a temperature of 90° C. to 130° C. for at least 30 seconds, alternatively 30 seconds to 2 hours.

12. The method of claim 1, where the method further comprises removing water during and/or after step 1).

13. The method of claim 1, where the method further comprises heating starting material A) to a temperature of at least 100° C. before step 1), thereby removing water.

14. The method of claim 1, where step 2) is performed by a method comprising filtering, stripping and/or distilling the reaction mixture.

15. The method of claim 1, where when B1) is B1i) the quaternary ammonium-fluorinated carboxylate complex, then B2) is the sulfonic acid.

16. The method of claim 1, where when B1) is the quaternary ammonium-sulfonate complex, then B2) is the fluorinated carboxylic acid.

* * * * *